(12) United States Patent
Tanizawa et al.

(10) Patent No.: US 8,130,472 B2
(45) Date of Patent: Mar. 6, 2012

(54) HEAD SUPPORT FOR A MAGNETIC DISK DEVICE

(75) Inventors: Hirokazu Tanizawa, Tokyo (JP);
Osamu Beppu, Kanagawa (JP);
Gentaro Nakamura, Kanagawa (JP);
Takahisa Okada, Kanagawa (JP)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 1128 days.

(21) Appl. No.: 11/998,755

(22) Filed: Nov. 30, 2007

(65) Prior Publication Data
US 2008/0151429 A1    Jun. 26, 2008

(30) Foreign Application Priority Data
Dec. 20, 2006 (JP) ................ 2006-343410

(51) Int. Cl.
*G11B 21/16* (2006.01)
*G11B 5/48* (2006.01)
(52) U.S. Cl. .................. 360/264.2
(58) Field of Classification Search ........... 360/266.3, 360/264.2
See application file for complete search history.

(56) References Cited

U.S. PATENT DOCUMENTS

| | | | | |
|---|---|---|---|---|
| 4,850,885 | A * | 7/1989 | Schell | 439/79 |
| 5,161,074 | A * | 11/1992 | Forbord et al. | 360/264.2 |
| 5,205,750 | A * | 4/1993 | Darrow et al. | 439/77 |
| 5,680,277 | A * | 10/1997 | Bonn et al. | 360/264.2 |
| 5,818,667 | A * | 10/1998 | Larson | 360/264.2 |
| 5,872,678 | A * | 2/1999 | Boigenzahn et al. | 360/97.01 |
| 5,995,321 | A * | 11/1999 | Ishida | 360/97.01 |
| 6,166,888 | A * | 12/2000 | Tsuda et al. | 360/264.2 |
| 6,480,362 | B1 * | 11/2002 | Yoshida et al. | 360/264.2 |
| 6,970,329 | B1 * | 11/2005 | Oveyssi et al. | 360/264.8 |
| 6,992,864 | B2 * | 1/2006 | Kaneko et al. | 360/264.2 |
| 7,119,993 | B2 * | 10/2006 | Zuo et al. | 360/264.2 |
| 7,227,725 | B1 * | 6/2007 | Chang et al. | 360/264.2 |
| 7,245,458 | B2 * | 7/2007 | Zhang et al. | 360/264.2 |
| 7,355,818 | B2 * | 4/2008 | McReynolds et al. | 360/264.2 |
| 7,492,603 | B2 * | 2/2009 | Seol et al. | 361/753 |
| 7,859,796 | B2 * | 12/2010 | Deguchi et al. | 360/264.2 |
| 7,881,016 | B2 * | 2/2011 | Chang et al. | 360/264.2 |
| 2005/0195530 | A1 * | 9/2005 | MacPherson | 360/264.2 |
| 2008/0088978 | A1 * | 4/2008 | Ho et al. | 360/264.2 |

FOREIGN PATENT DOCUMENTS

| | | |
|---|---|---|
| JP | 2005-108387 A | 4/2005 |
| JP | 2005-339641 A | 12/2005 |

* cited by examiner

*Primary Examiner* — Brian Miller

(57) ABSTRACT

Embodiments of the present invention provide a magnetic disk device that can reduce an external force applied to the carriage. According to one embodiment, in a magnetic disk device, a bracket inserted between a carriage and a base is supported toward the base side by support portions owned by the bracket and by a band with a space provided between the bracket and the opposed side of the carriage (such as a top surface of the mounting stand). This configuration cannot apply an external force in the rotation direction to the carriage from the bracket even when the bracket is thermally expanded due to heat generated from a head amplifier or the like mounted on a flexible substrate.

14 Claims, 9 Drawing Sheets

HEAD SUPPORT FOR A MAGNETIC DISK DEVICE

CROSS-REFERENCE TO RELATED APPLICATION

The instant nonprovisional patent application claims priority to Japanese Patent Application No. 2006-343410 filed Dec. 20, 2006 and which is incorporated by reference in its entirety herein for all purposes.

BACKGROUND OF THE INVENTION

In magnetic disk devices, such as a hard disk, a carriage for supporting a magnetic head is rotatably disposed. This carriage is rotated to move the magnetic head to a desired position on the magnetic disk so as to magnetically record or reproduce data. To the carriage is attached a flexible substrate which includes wiring electrically connected to the magnetic head or the like.

FIG. 9 is a diagram partly showing a structure of a conventional magnetic disk device. A mounting stand 92 for mounting a flexible substrate 94 is disposed on the side of a carriage 91. The flexible substrate 94 has a portion on the tip side lined with a base 95. The portion is screwed to the mounting stand 92 of the carriage 91 with a screw 98 via a bracket 97 made of resin material or the like. As shown in FIG. 10, the bracket 97 is screwed with the screw 98 to be sandwiched between the carriage 91 and the base 95.

One of the problems of a magnetic disk device is an off-track problem that that a magnetic head moving on a magnetic disk deviates from a position on a track where the head is to be positioned. The off-track problem is caused, for example, by application of an external force in a rotation direction with respect to a carriage.

For the magnetic disk device having the structure shown in FIGS. 9 and 10, when the bracket 97 sandwiched between the carriage 91 and the base 95 expands due to heat generated from a head amplifier integrated circuit 96 or the like mounted on the flexible substrate 94, an external force may be applied to the carriage 91 in the rotation direction. The head amplifier integrated circuit 96 is often overheated during execution of a read/write process. For example, the bracket 97 expands due to the heat generated during reading, which may lead to a change in relative positions between the bracket 97 and the carriage 91. This may cause off-track suddenly, resulting in a read error. On the other hand, when off-track suddenly occurs in writing, recorded data on an adjacent track of the disk may be deleted, causing a problem of off-track write. Furthermore, when the magnetic disk is used in a place where a temperature environment condition is strict (for example, in a vehicle-mounted HDD, such as a car navigation system), an increase in temperature of the head amplifier integrated circuit is much larger than that in a normal environment. Thus, the above-mentioned off-track problem tends to occur.

BRIEF SUMMARY OF THE INVENTION

Embodiments in accordance with the present invention provide a magnetic disk device that can reduce an external force applied to the carriage. According to the particular embodiment of FIG. 3, in a magnetic disk device 41, a bracket inserted between a carriage 11 and a base 32 is supported toward the base 32 side by support portions 73, 74 joined by the bracket and by a band 45 with a space provided between the bracket and the opposite side of the carriage (such as a top surface of the mounting stand 61). This configuration cannot apply an external force in the rotation direction to the carriage 11 from the bracket 41 even when the bracket 41 is thermally expanded due to heat generated from a head amplifier IC 34 or the like mounted on flexible substrate 31.

DETAILED DESCRIPTION OF THE INVENTION

Figure 1:
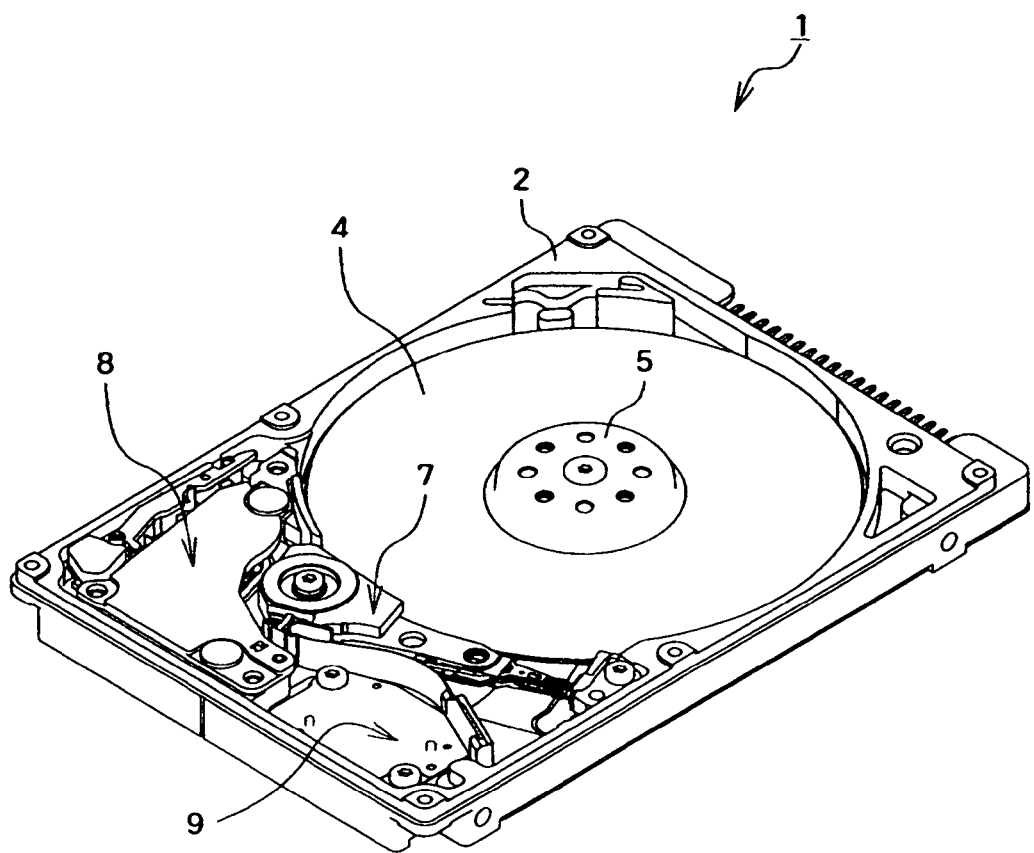
FIG. 1 is a perspective view showing a magnetic disk device according to one embodiment of the invention.

Embodiments of the present invention relate to a magnetic disk device in which a flexible substrate is attached to a carriage for supporting a magnetic head.

Embodiments of the invention have been made in view of the foregoing problems, and it is an object of embodiments of the invention to provide a magnetic disk device which can reduce the external force applied to the carriage.

In order to solve the above-mentioned problems, a magnetic disk device of embodiments of the invention, which has a carriage for supporting a magnetic head, is characterized by that it comprises a flexible substrate attached to a side of the carriage, a base provided in contact with the flexible substrate, and a bracket provided in contact with the base. Further, the bracket is arranged such that a protrusion in an attachment position provided on the side of the carriage is in contact with the base to form a space between the bracket and an area other than the protrusion in the attachment position.

In the magnetic disk device according to embodiments of the invention, the bracket is arranged so as to form the space between the bracket and a surrounding surface of the protrusion.

In the magnetic disk device according to embodiments of the invention, a top surface of the protrusion is in contact with the base.

In the magnetic disk device according to embodiments of the invention, the bracket has a notched shape along a surrounding area of at least a part of the protrusion.

In the magnetic disk device according to embodiments of the invention, the protrusion and the base are engaged by a screw.

In the magnetic disk device according to embodiments of the invention, the top surface of the area other than the protrusion has a tapered or stepped shape such that the space is widened according to a distance from the protrusion.

In the magnetic disk device according to embodiments of the invention, the protrusions in contact with the base are formed in two or more positions at the carriage.

In the magnetic disk device according to embodiments of the invention, the protrusion is formed by a spacer which is a different member from the carriage.

In the magnetic disk device according to embodiments of the invention, a coefficient of thermal expansion of the base is lower than that of the bracket.

In the magnetic disk device according to embodiments of the invention, a coefficient of thermal conductivity of the base is higher than that of the bracket.

Next, a magnetic disk device according to embodiments of the invention, which has a carriage for supporting a magnetic head, is characterized by that it comprises a flexible substrate attached to a side of the carriage, a base provided in contact with the flexible substrate, and a bracket provided in contact with the base. Further, a coefficient of thermal expansion of the base is lower than that of the bracket. Moreover, the bracket is arranged such that a protrusion in an attachment position provided on the side of the carriage is in contact with the base to form a space between the bracket and an area other than the protrusion in the attachment position.

In the magnetic disk device according to embodiments of the invention, the bracket is arranged so as to form the space between the bracket and a surrounding surface of the protrusion.

In the magnetic disk device according to embodiments of the invention, a top surface of the protrusion is in contact with the base.

In the magnetic disk device according to embodiments of the invention, the bracket has a notched shape along a surrounding area of at least a part of the protrusion.

In the magnetic disk device according to embodiments of the invention, the protrusion and the base are engaged by a screw.

In the magnetic disk device according to embodiments of the invention, the top surface of the area other than the protrusion has a tapered or stepped shape such that the space is widened according to a distance from the protrusion.

In the magnetic disk device according to embodiments of the invention, the protrusions in contact with the base are formed in two or more positions at the carriage.

In the magnetic disk device according to embodiments of the invention, the protrusion is formed by a spacer which is a different member from the carriage.

In the magnetic disk device according to embodiments of the invention, a coefficient of thermal conductivity of the protrusion is higher than that of the bracket.

In the magnetic disk device according to embodiments of the invention, a coefficient of thermal conductivity of the base is higher than that of the bracket.

According to the embodiments of the invention, an external force applied to the carriage can be reduced.

Some preferred embodiments of the invention will now be described with reference to the accompanying drawings.

FIG. 1 is a perspective view showing a magnetic disk device 1 according to one embodiment of the invention. The magnetic disk device 1 include a case 2 having a rectangular box shape with its upper surface opened, and a top cover (not shown) for closing an opening of the case 2.

The case 2 accommodates therein a magnetic disk 4, a spindle motor 5 for rotating the magnetic disk 4, a head stack assembly 7 rotatably provided for supporting a magnetic head which magnetically records and reproduces data on and from the magnetic disk 4, a voice coil motor 8 for rotating the head stack assembly 7 to move the magnetic head on the magnetic disk 4, and a connection unit 9 for transmitting electrical signals from electronic components (not shown) mounted on the back of the case 2 to the magnetic head and the voice coil motor 8.

Figure 2:
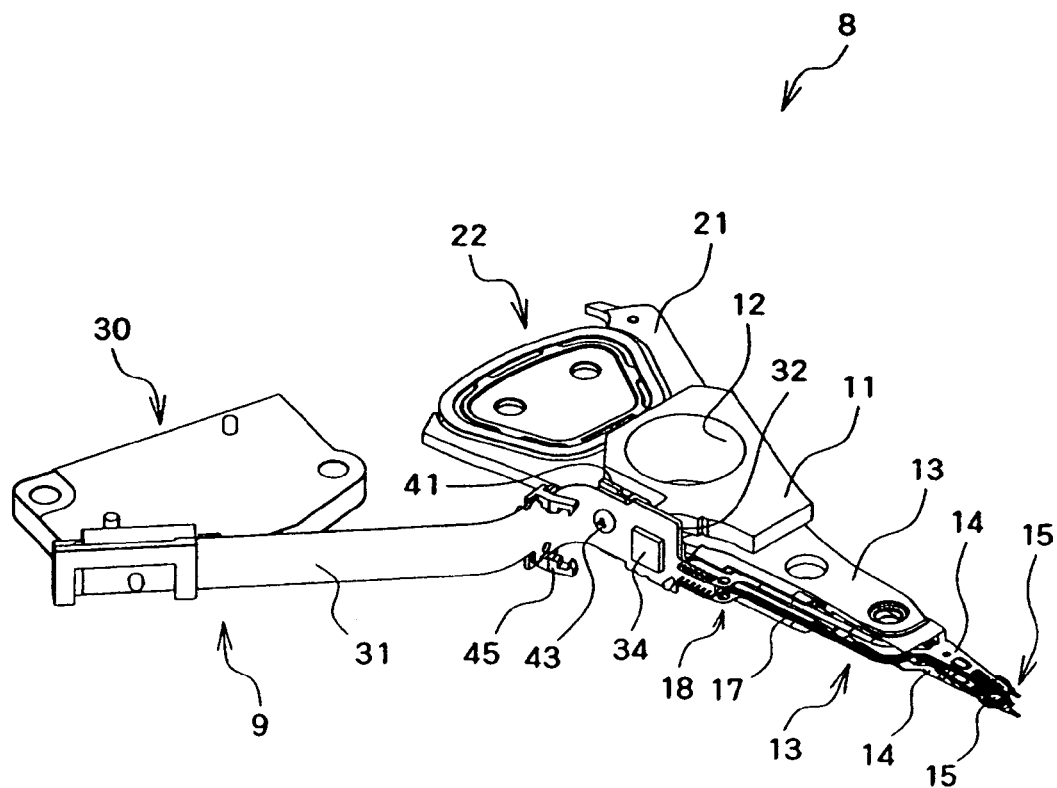
FIG. 2 is a perspective view showing in detail a head stack assembly and a connection unit which are included in the magnetic disk device according to one embodiment of the invention.

FIG. 2 is a perspective view showing in detail the head stack assembly 7 and the connection unit 9.

The head stack assembly 7 is constructed with the carriage 11 being at the center. An insertion hole 12 into which a bearing unit fixed to the case 2 is inserted is provided in the carriage 11. A rotation shaft of the head stack assembly 7 is defined by the bearing unit which is inserted into the insertion hole 12.

A plurality of flat plate-shaped arms 13 are provided on one side of the carriage 11 to extend in the direction away from the rotation shaft. Suspensions 14 made of a plate spring are provided to extend from the respective arms 13 in the direction away from the rotation shaft. Magnetic heads 15 are fixed to the tips of the respective suspensions 14 by gimbals. In this way, the carriage 11 supports the magnetic heads 15.

The magnetic head 15 includes a slider having the shape for generating a floating force by the viscosity of air (ABS: Air Bearing Surface), and a thin film element attached to the slider for magnetically recording and reproducing the data on and from the magnetic disk 4.

The magnetic head 15 is connected to a head wiring 17. The head wiring 17 is disposed along the side edge of the arm 13, and connected to a terminal portion 18 disposed on the basic end side of the arm 13.

A support frame 21 is provided on the opposite side to the side on which the arm 13 of the carriage 11 is disposed. The support frame 21 is provided with a wound coil 22. The coil 22 comprises a part of the voice coil motor 8.

The connection unit 9 has a unit body 30 which includes a connector connected to electronic components (not shown) mounted on the back side of the case 2. A strip flexible substrate (FPC: Flexible Printed Circuits) 31 extends from the unit body 30. The flexible substrate 31 includes wiring electrically connected to the magnetic head 15 and wiring electrically connected to the coil 22.

The tip part of the flexible substrate 31 has one side (hereinafter referred to as a back face) lined with a plate-like base 32 made of metal material, such as aluminum. The base 32 is bonded to the flexible substrate 31, for example, by an adhesive.

A head amplifier integrated circuit (head amplifier IC) 34 is mounted to the opposite side surface of the flexible substrate 31 (hereinafter referred to as a mounting surface) to the side lined with the base 32. The head amplifier IC 34 amplifies a recording signal input from the electronic component mounted on the back side of the case 2 to output it to the magnetic head 15. The head amplifier IC 34 amplifies a reproduction signal input from the magnetic head 15 to output it to the electronic component mounted on the back side of the case 2.

The base 32 provided in the flexible substrate 31 is partly covered with a plate-like bracket 41 made of resin material, while being fixed in engagement with the side of the carriage 11 by a screw 43 serving as an engagement member. The side of the carriage 11 as used herein means a side surface when the direction along the rotation shaft of the head stack assembly 7 is a vertical direction. In other words, this side is an outer surface intersecting the rotation direction of the head stack assembly 7.

A band 45 attached to a midpoint of the flexible substrate 31 holds the flexible substrate 31, the base 32, and the side of the bracket 41 in the direction of a plate thickness, while folding the flexible substrate 31, thereby to support the bracket 41 toward the base 32 side. The band 45 serves as a first support member for supporting the bracket 41 toward the base 32 side.

Figure 3:
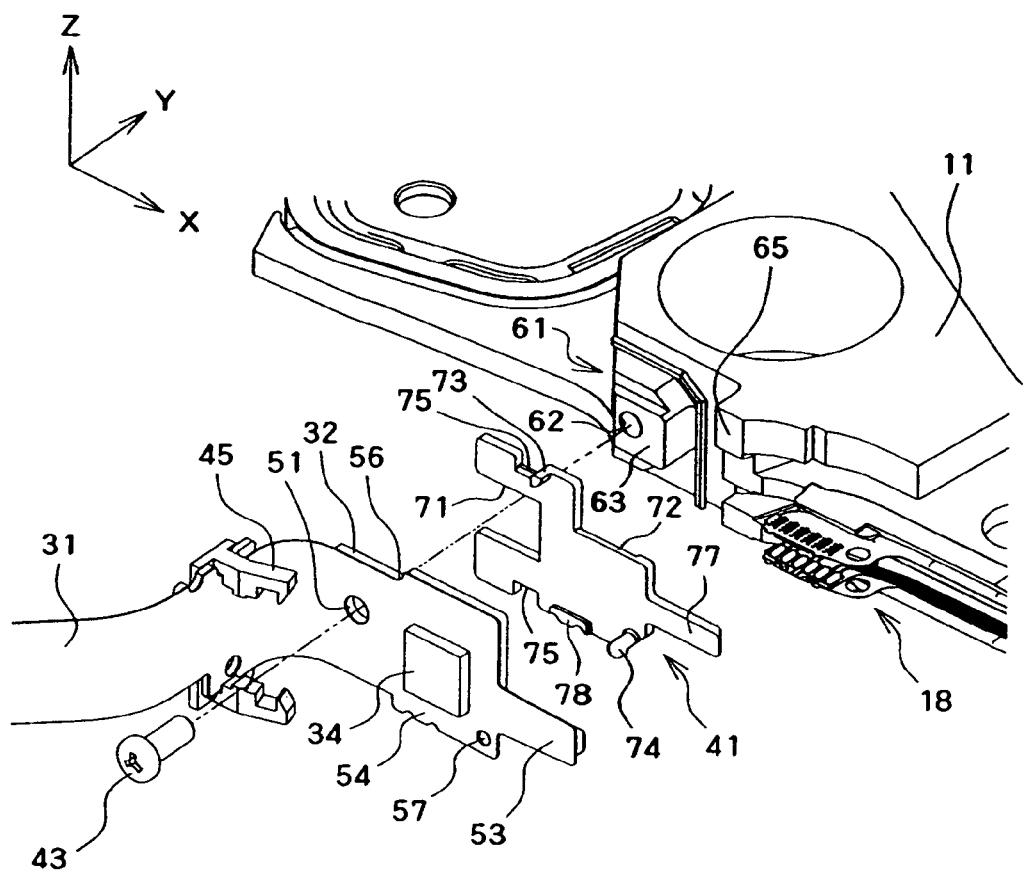
FIG. 3 is an enlarged view of a main part of FIG. 2.
Figure 4:
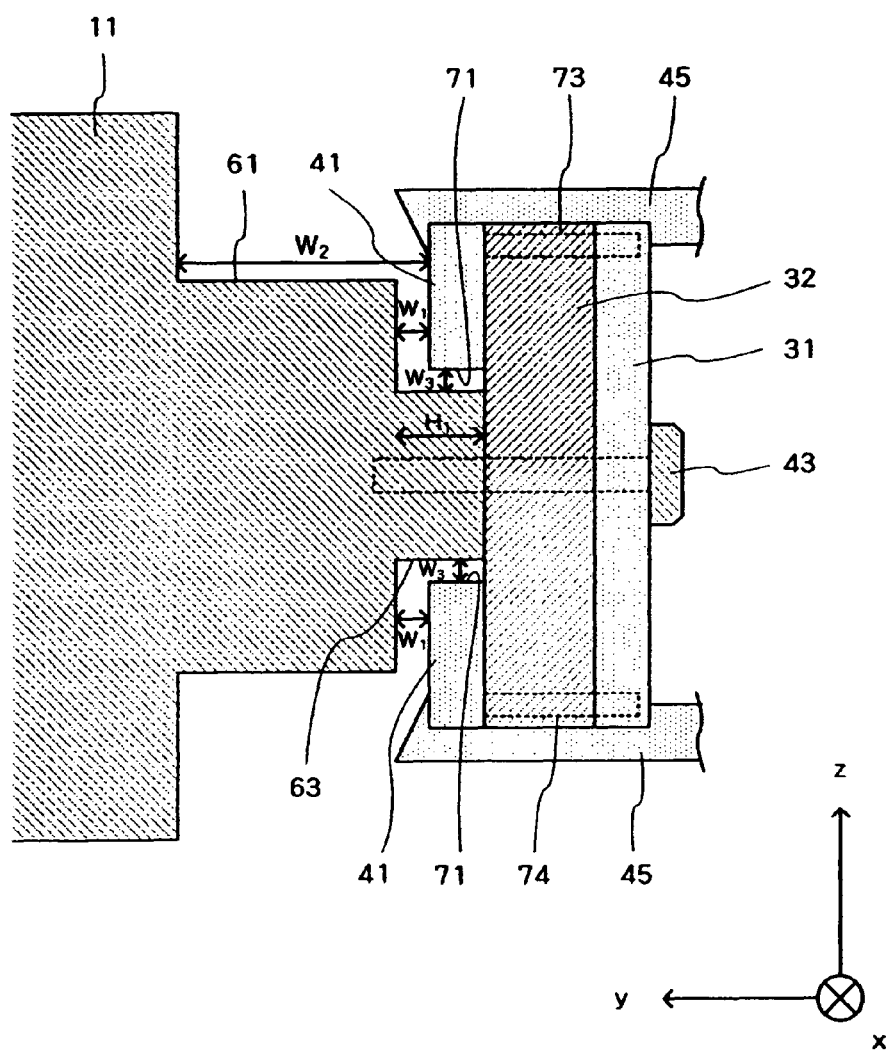
FIG. 4 is a diagram schematically showing sections of engagement parts shown in FIG. 3.
Figure 5:
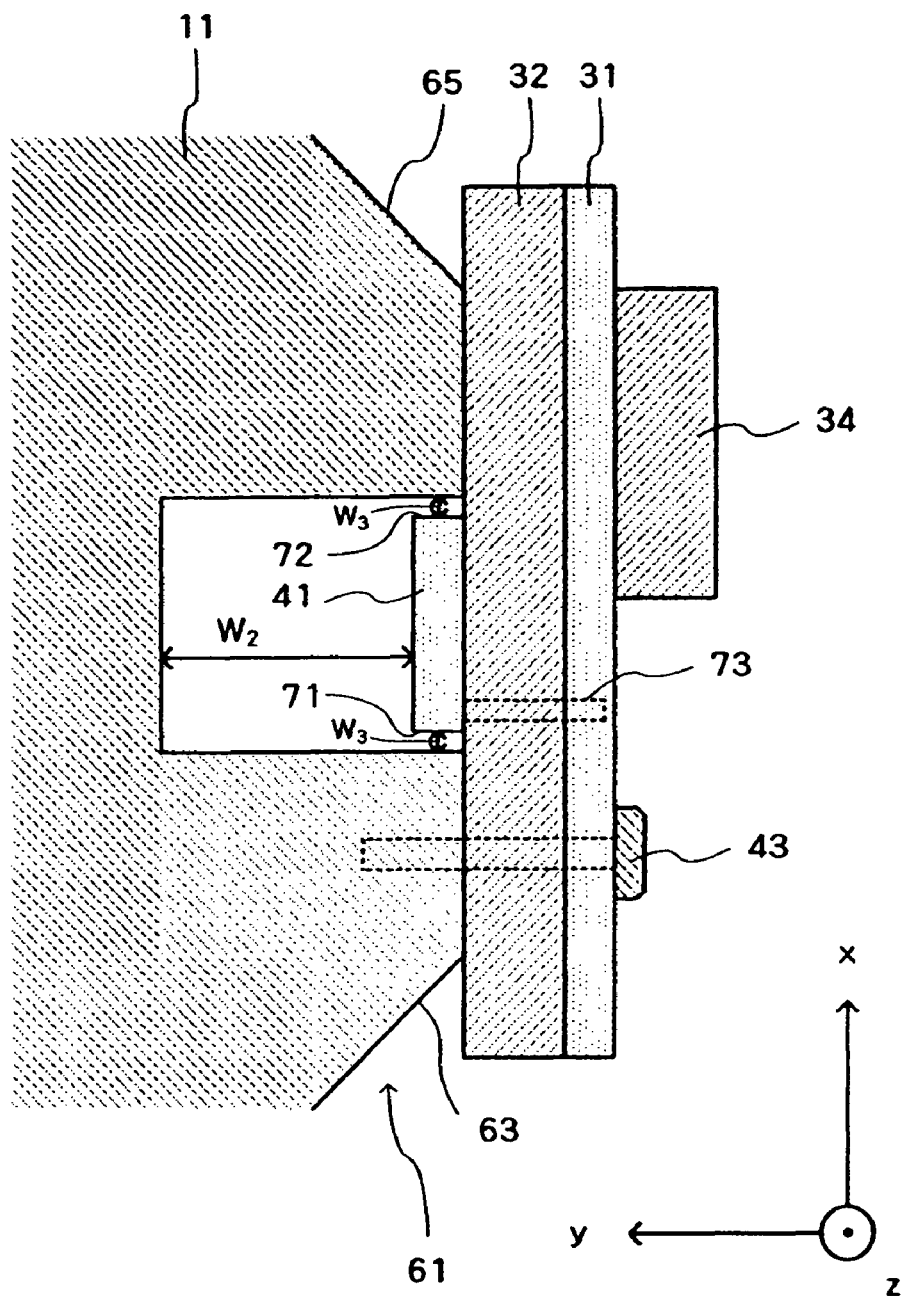
FIG. 5 is a diagram schematically showing sections of the engagement parts shown in FIG. 3.

FIG. 3 is an enlarged view showing parts of the flexible substrate 31 engaged with the carriage 11. In this figure, members are shown to be separated from each other for explanation. FIG. 4 and FIG. 5 are diagrams schematically showing sections of engaged parts.

In these figures, the x axis represents an axis along the extending direction of the arm 13 and the suspension 14, the y axis represents an axis along the insertion direction of the screw 43 (direction of a normal line of the side surface of the carriage 11), and the z axis represents a rotation shaft of the head stack assembly 7.

A mounting stand 61 is provided in a position of the side of the carriage 11 near the rotation shaft of the head stack assembly 7 for mounting the flexible substrate 31 in such a form that a part of the side of the carriage 11 protrudes outward. A protrusion 63 is provided on the top surface of the mounting stand 61 in such a form that a part of the top surface of the mounting stand 61 further protrudes outward. The top surface of the protrusion 63 has a screw hole 62 into which the screw 43 penetrating the flexible substrate 31 and the base 32 is inserted. The top surface of the protrusion 63 is in contact with the base 32 with the flexible substrate 31 and the base 32 engaged with the screw 43.

A protrusion 65 is also provided on the side of the carriage 11 in a position on the arm 13 side with respect to the protrusion 63 (in a position near the head amplifier IC 34 mounted on the flexible substrate 31) in such a form that a part of the side of the carriage 11 protrudes outward. Also, the top surface of this protrusion 65 is in contact with the base 32 with the flexible substrate 31 and the base 32 engaged with the screw 43.

The flexible substrate 31 has a screw hole 51 into which the screw 43 is inserted, in a position corresponding to the screw hole 62 of the protrusion 63 of the carriage 11. The base 32 also has a screw hole in the same position.

The flexible substrate 31 is provided with an elongated connection portion 53 extending from the tip part thereof. The connection portion 53 has on a mounting surface a terminal of the wiring to be electrically connected to the magnetic head 15 included in the flexible substrate 31. The connection portion 53 is connected to the terminal portion 18 provided on the head stack assembly 7 side by soldering. The terminal portion 18 provided on the carriage 11 side is provided in the form of two separated portions in the vertical direction. The connection portion 53 of the flexible substrate 31 is soldered, while being inserted into a space between the vertical portions. The base 32 has the same shape as that of the connection portion 53, and reinforces the part of the connection portion 53.

A connection portion 54 is provided on the side of the tip part of the flexible substrate 31. The connection portion 54 has on a mounting surface a terminal of the wiring to be electrically connected to the coil 22 included in the flexible substrate 31. The connection portion 54 is connected to a terminal portion (not shown) of the coil 22 provided on the head stack assembly 7 side by soldering. The terminal portion of the coil 22 extends from the carriage 11 side toward the mounting surface side of the flexible substrate 31 to be soldered to the connection portion 54. The base 32 has a notched portion (not shown) in a position corresponding to the connection portion 54 so as not to short-circuit with the terminal portion of the coil 22.

Support corresponding portions 56 and 57 having a shape corresponding to that of a support member (support portions 73 and 74 to be described later) included in the bracket 41 are formed in positions corresponding the support members on the flexible substrate 31. The support corresponding portion 56 has a notched shape which is obtained by partly notching one side part of the flexible substrate 31. The base 32 has the same shape. On the other hand, the support corresponding portion 57 has a shape which is obtained by partly penetrating the other side part of the flexible substrate 31. This base is notched in a position (not shown) corresponding to the support corresponding portion 57.

The bracket 41 has a notched portion 71 which is formed by notching a portion of the bracket corresponding to the protrusion 63 of the carriage 11, and the notched portion 71 encloses a part of a surrounding area of the protrusion 63. Since the bracket 41 has the notched portion 71, the protrusion 63 of the carriage 11 is directly brought into contact with the base 32. This notched portion 71 may be formed so as to enclose a contact area between the base 32 and the protrusion 63, which area is engaged by the screw 43. The notched portion 71 is not limited to a recessed shape shown in FIG. 3, but one to completely enclose the contact area. Similarly, the bracket 41 has a notched portion 72 which is formed by notching a portion of the bracket corresponding to the protrusion 65 of the carriage 11, and the notched portion 72 encloses a part of a surrounding area of the protrusion 65. Since the bracket 41 has the notched portion 72, the protrusion 65 of the carriage 11 is directly brought into contact with the base 32. Note that although the notched portion 72 is located in only one position as shown in FIG. 3, the notched portions may be located in two or more positions.

The bracket 41 has a protruding support portion 73 disposed on one side and protruding toward the base 32 side. The support portion 73 is hung on the support corresponding portion 56 with a notched shape which is formed on the side of the flexible substrate 31. On the other hand, the bracket 41 also has a protruding support portion 74 disposed on the other side and protruding toward the base 32 side. The support portion 74 is fitted into a support corresponding portion 57 with a penetrating shape which is formed on the side of the flexible substrate 31. Thus, the bracket 41 is supported toward the base 32 side by the support portions 73 and 74 integrally formed with the bracket itself. That is, the support portions 73 and 74 integrally formed with the bracket 41 serve as a second support member for supporting the bracket 41 toward the base 32 side.

The bracket 41 has band fitting portions 75 formed in a notched shape so as to fit the bands 45 attached to the midpoint of the flexible substrate 31 to both sides of the bracket 41. The bands 45 are fitted into the band fitting portions 75 of the bracket 41 with the flexible substrate 31, the base 32, and the bracket 41 superimposed on one another to hold the sides of these elements in the direction of thickness of the plate.

The bracket 41 has a connection corresponding portion 77 located in a position corresponding to the connection portion 53 of the flexible substrate 31, the connection portion 77 having the same shape as that of the connection portion 53. The connection portion 77 is inserted into a space between the vertical portions of the terminal portion 18 disposed on the carriage 11 side, together with the connection portion 53. The bracket 41 has a connection corresponding portion 78 which is thicker than other portions, and which is located in a position corresponding to the connection portion 54 of the flexible substrate 31. The connection corresponding portion 78 corresponds to a notched portion (not shown) of the base 32 so as to avoid short-circuit between the base 32 and the terminal portion of the coil 22.

According to this embodiment as mentioned above, the bracket 41 inserted between the carriage 11 and the base 32 is supported toward the base 32 side by the support portions 73, 74 owned by the bracket 41, and by the band 45. The bracket 41 is provided with a space W1 with respect to the opposite side of the carriage 11 (such as a top surface of the mounting stand 61) as shown in FIGS. 4 and 5.

Since the bracket 41 has the notched portion 71, the carriage 11 is engaged with the base 32 made of metal material having a lower coefficient of thermal expansion than that of the bracket 41, not through the bracket 41 formed of resin material.

In this way, the bracket 41, which is made of resin material having a higher coefficient of thermal expansion than that of the base 32 or the like, is configured not to be in contact with the side of the carriage 11 (top surface of the mounting stand 61 and the like). Even when the heat generated from the head amplifier IC 34 or the like mounted on the flexible substrate 31 thermally expands the bracket 41, no external force in the rotation direction can be applied from the bracket 41 to the carriage 11. As a result, this can avoid occurrence of the off-track problem in the read/write operation.

The thickness of the bracket 41 needs to be smaller than a distance between the top surface of the mounting stand 61 of the carriage 11 and the base 32 (that is, a protruding height H1 from the top surface of the mounting stand 61 of the protrusion 63). More specifically, the thickness of the bracket 41 (in other words, a width of the space W1) can be appropriately set to such a size that the thermally expanded bracket 41 is not brought into contact with the carriage 11, taking into consideration the thermal expansion degree of the bracket 41, the tolerance of the protruding height H1 of the protrusion 63, and the like.

As shown in FIGS. 4 and 5, the notched portion 71 formed in the bracket 41 may be dimensioned to enclose the top surface of the protrusion 63, and may be configured not to keep the bracket 41 from contact with a surrounding surface of the protrusion 63. Thus, a space W3 is formed between the bracket 41 and the surrounding surface of the protrusion 63, which can prevent the thermal expansion of the bracket 41 from affecting the carriage 11. The notched portion 72 can be configured in the same manner with respect to the protrusion 65.

Figure 6:
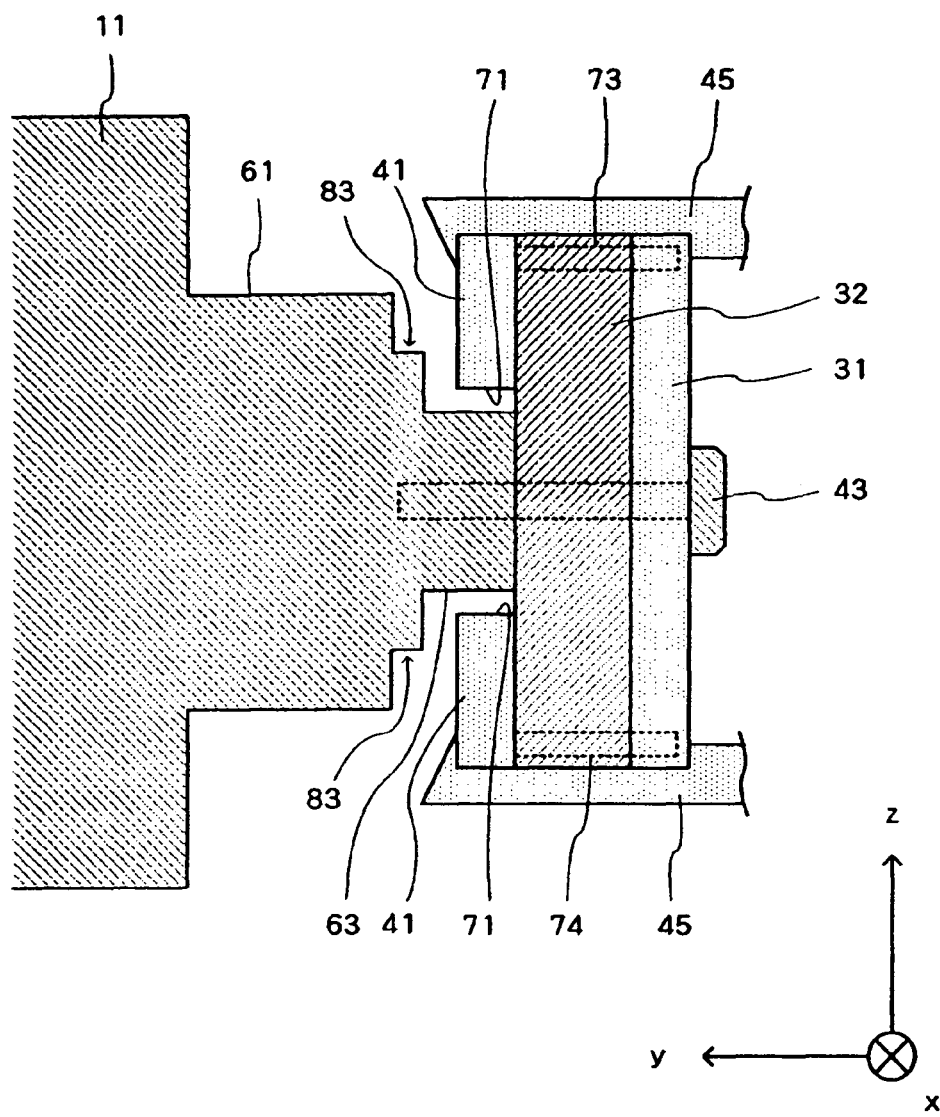
FIG. 6 shows a modified example of the engagement parts shown in FIG. 3.
Figure 7:
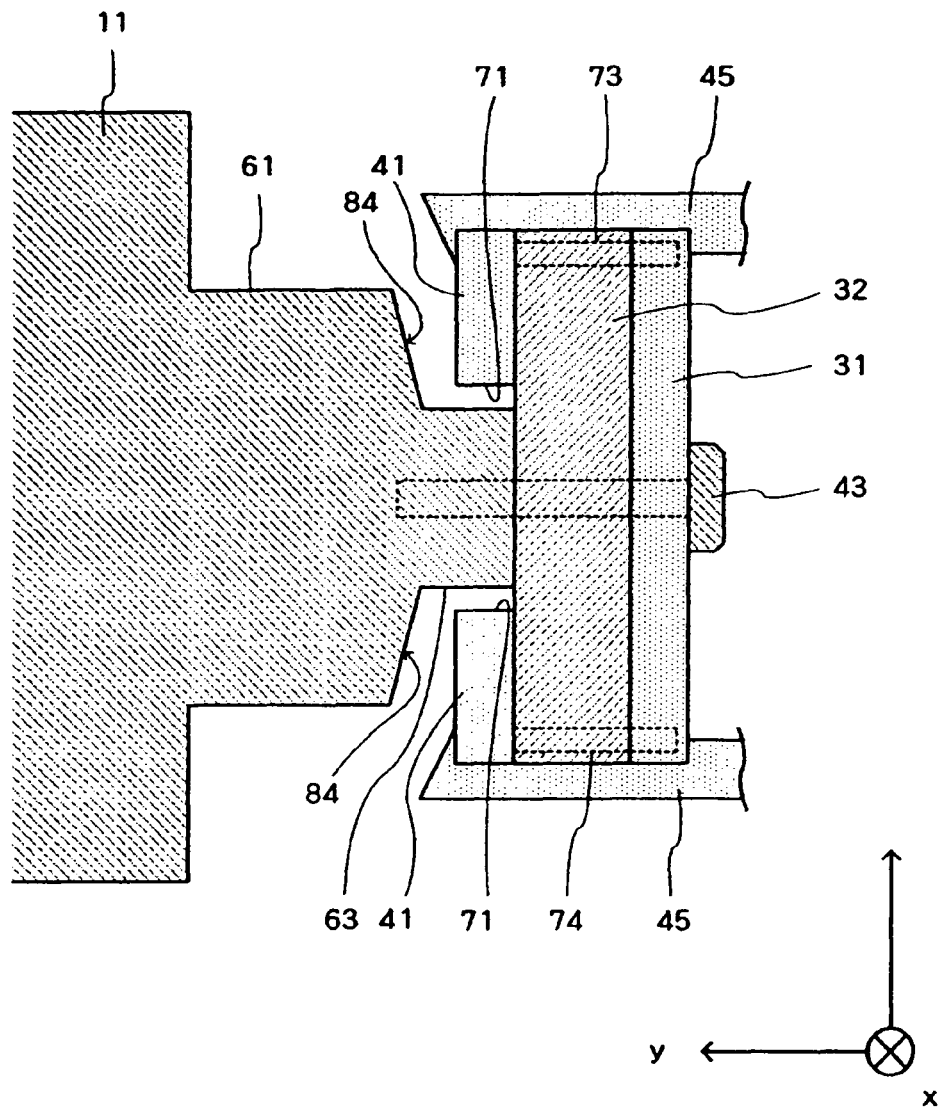
FIG. 7 shows a modified example of the engagement parts shown in FIG. 3.

The space W1 between the bracket 41 and the carriage 11 can have its width changed according to the position thereof. For example, a stepped shape 83 shown in FIG. 6 and/or a tapered shape 84 shown in FIG. 7 may be formed on the side of the carriage 11 (the top surface of the mounting stand 61 or the like) such that the width of the space extends according to a distance apart from the contact position between the carriage 11 and the base 32 (the position(s) of the protrusion 63 and/or the protrusion 65). Even when distortion of the base 32 occurs, this can make it difficult to bring the bracket 41 into contact with the carriage 11. Such a stepped or tapered portion may be provided on the bracket 41 side, or may be provided both on the carriage 11 and the bracket 41.

Reference character W2 as used herein means a space that is designed to route wiring of the coil 22 included in the voice coil motor 8. When the routing of the wiring is arranged in another position, this space (a deep groove having the depth W2) becomes unnecessary. In this example, the minimum space W1 needs to be ensured so as to avoid the contact with the bracket 41.

According to this embodiment described above, as shown in FIGS. 4 and 5, the protrusions 63 and 65 of the carriage 11 are in contact with the base 32 made of metal material having a higher coefficient of thermal conductivity than that of the bracket 41 not through the bracket 41 made of the resin material.

In this way, the base 32, which is made of the metal material having the higher coefficient of thermal conductivity than that of the bracket 41, is brought into contact with the protrusions 63 and 65 formed on the side of the carriage 11. This can dissipate heat generated from the head amplifier IC 34 or the like mounted on the flexible substrate 31, into the carriage 11.

Furthermore, the heat generated from the head amplifier IC 34 or the like is dissipated into the carriage 11, which reduces the heat stored in the base 32. This can restrain thermal expansion of the bracket 41. As a result, the bracket 41 is further prevented from contacting the carriage 11, which can avoid the occurrence of the off-track problem.

As shown in FIG. 5, the base 32 is in contact with the protrusion 63 and the protrusion 65 formed on the sides of the carriage 11. In this way, the base 32 is in contact with the carriage 11 in a plurality of positions. This can increase the contact area to expedite heat dissipation, while preventing teetering of the base 32.

Among the protrusions 63 and 65 formed on the side surfaces of the carriage 11, one protrusion 63 is engaged with the base 32 by the screw 43 as shown in FIGS. 4 and 5. Thus, the notched portion 71 is provided in the surrounding area of the screw 43, and the protrusion 63 and the base 32 are engaged with each other by the screw 43, so that the degree of contact between both can be enhanced to expedite the heat dissipation. A contact area between the screw 43 and a member into which the screw 43 is inserted (the base 32 and the protrusion 63) is large, and thus the heat dissipation can be expedited via the screw 43.

Among the protrusions 63 and 65 formed on the side surfaces of the carriage 11, the other protrusion 65 is configured to be opposed to the head amplifier IC 34 via the base 32 and the flexible substrate 31 as shown in FIG. 5. With this arrangement, the heat generated from the head amplifier IC 34 can be effectively dissipated from the protrusion 65.

According to this embodiment described above, as shown in FIG. 3, the bracket 41 has the connection corresponding portion 77 and the connection corresponding portion 78 which correspond to the connection portion 53 and the connection portion 54, respectively, provided in the flexible substrate 31. These connection corresponding portions 77 and 78 are useful for connecting the connection portions 53 and 54 of the flexible substrate 31 by soldering. In other words, the back sides of the connection portions 53 and 54 of the flexible substrate 31 are covered with the connection corresponding portions 77 and 78 made of resin material. For example, in connection by soldering by irradiating heat rays, such as laser light, the heat by the heat rays irradiated can be prevented from being diffused, leading to a reduction in irradiation time.

Figure 8:
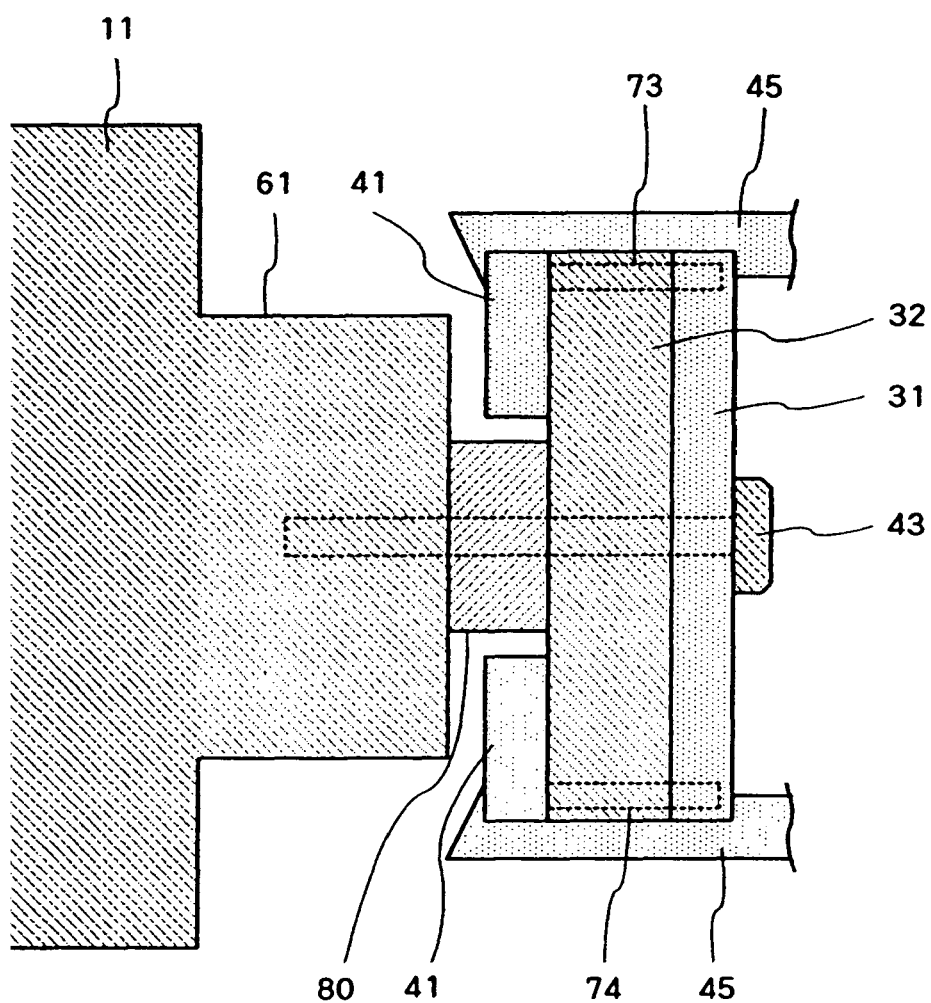
FIG. 8 shows a modified example of the engagement parts shown in FIG. 3.
Figure 9:
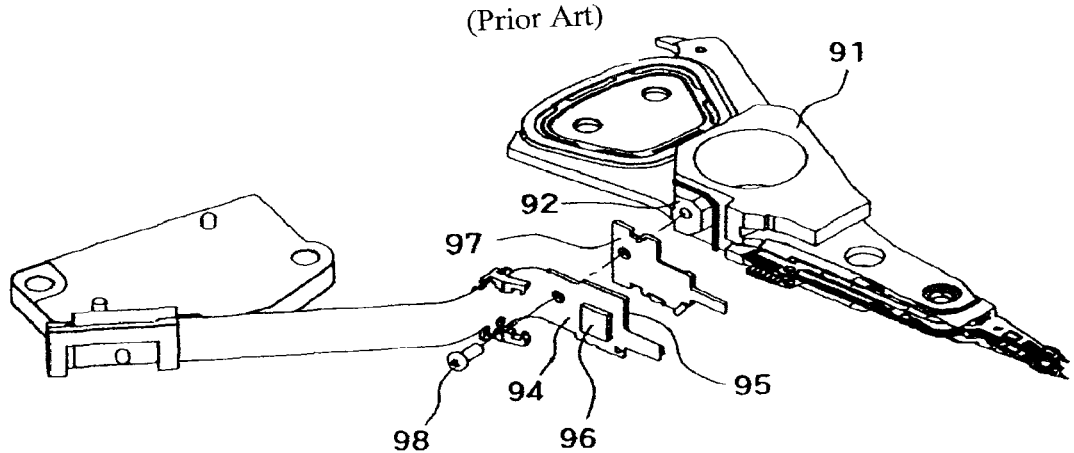
FIG. 9 is a diagram partly showing a structure of a conventional magnetic disk device.
Figure 10:
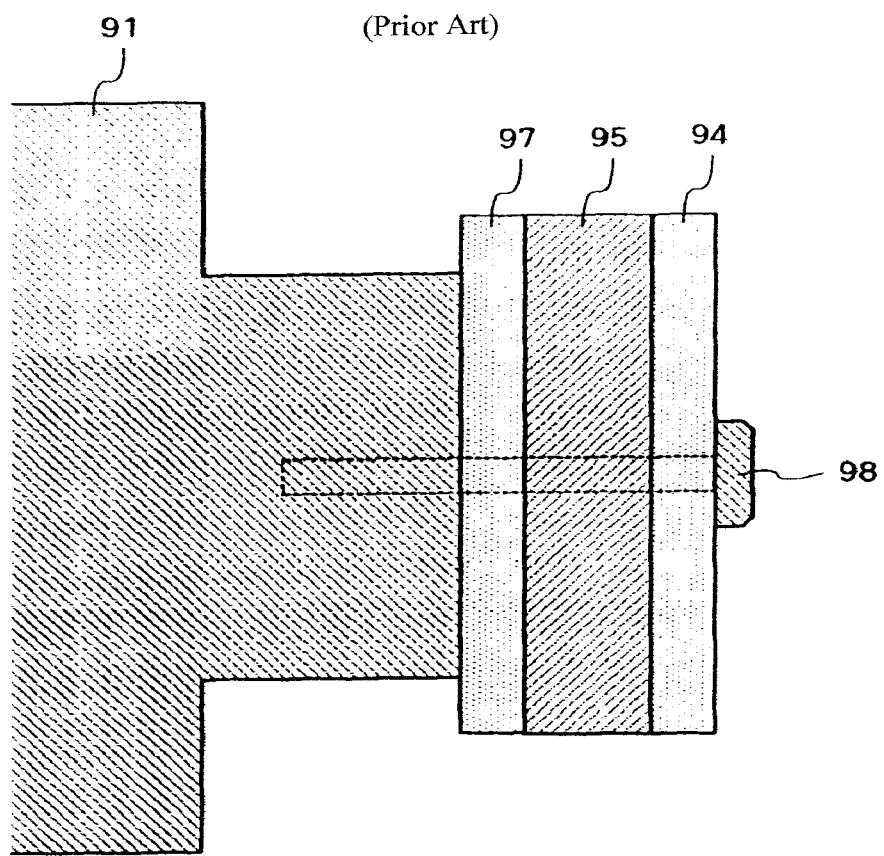
FIG. 10 is an explanatory diagram of engagement parts of the conventional magnetic disk device.

In the above description, some embodiments of the invention have been described, but the invention is not limited to the disclosed exemplary embodiments. For example, the protrusion 63 is provided on the top surface of the mounting stand 61 provided on the side of the carriage 11, and a part of the bracket 41 is notched corresponding to the protrusion 63 so as to bring the protrusion 63 into contact with the base 32. However, the embodiments of the invention are not limited thereto. That is, instead of provision of the protrusion 63, as shown in FIG. 8, a spacer 80 made of metal material may be disposed between the mounting stand 61 and the base 63. This spacer 80 keeps the space between the side of the carriage 11 (top surface or the like of the mounting stand 61) and the bracket 41, like the protrusion 63 of the above-mentioned embodiment.

Since the spacer 80 is formed of the metal material having a lower coefficient of thermal expansion than that of the bracket 41, the spacer 80 can prevent an excessive external force from being applied to the carriage 11 even in contact with the carriage 11. Also, since the spacer 80 is formed of the metal material having a higher coefficient of thermal conductivity than that of the bracket 41, the spacer 80 can dissipate the heat generated from the head amplifier IC 34 or the like mounted on the flexible substrate 31 into the carriage 11.

What is claimed is:

1. A magnetic disk device having a carriage for supporting a magnetic head, comprising:
    a flexible substrate attached to a side of the carriage;
    a base provided in contact with the flexible substrate; and
    a bracket provided in contact with the base, wherein said bracket is arranged such that a protrusion in an attachment position provided on the side of the carriage is in contact with the base to form a gap between the bracket and an area other than the protrusion in the attachment position, wherein said bracket has a notched shape along a surrounding area of at least a part of the protrusion.

2. The magnetic disk device according to claim 1, wherein the bracket is arranged so as to form the gap between the bracket and a surrounding surface of the protrusion.

3. The magnetic disk device according to claim 1, wherein said protrusion and the base are engaged by a screw.

4. The magnetic disk device according to claim 1, wherein the top surface of the area other than the protrusion has a tapered or stepped shape such that said space is widened according to a distance from the protrusion.

5. The magnetic disk device according to claim 1, wherein said protrusion is formed by a spacer which is a different member from the carriage.

6. The magnetic disk device according to claim 1, wherein a coefficient of thermal expansion of the base is lower than that of the bracket.

7. The magnetic disk device according to claim 1, wherein a coefficient of thermal conductivity of the base is higher than that of the bracket.

8. A magnetic disk device having a carriage for supporting a magnetic head, comprising:
    a flexible substrate attached to a side of the carriage;
    a base provided in contact with the flexible substrate; and
    a bracket provided in contact with the base, wherein a coefficient of thermal expansion of the base is lower than that of the bracket, and
    wherein the bracket is arranged such that a protrusion in an attachment position provided on the side of the carriage is in contact with the base to form a gap between the bracket and an area other than the protrusion in the attachment position, wherein said bracket has a notched shape along a surrounding area of at least a part of the protrusion.

9. The magnetic disk device according to claim 8, wherein the bracket is arranged so as to form the gap between the bracket and a surrounding surface of the protrusion.

10. The magnetic disk device according to claim 8, wherein said protrusion and the base are engaged by a screw.

11. The magnetic disk device according to claim 8, wherein the top surface of the area other than the protrusion has a tapered or stepped shape such that said space is widened according to a distance from the protrusion.

12. The magnetic disk device according to claim 8, wherein said protrusion is formed by a spacer which is a different member from the carriage.

13. The magnetic disk device according to claim 8, wherein a coefficient of thermal conductivity of the protrusion is lower than that of the bracket.

14. The magnetic disk device according to claim 8, wherein a coefficient of thermal conductivity of the base is higher than that of the bracket.

* * * * *